United States Patent
Bernreitner et al.

(10) Patent No.: US 8,207,272 B2
(45) Date of Patent: Jun. 26, 2012

(54) TOUGH COMPOSITION FOR FOOD APPLICATIONS

(75) Inventors: Klaus Bernreitner, Linz (AT); Christelle Grein, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 12/998,505

(22) PCT Filed: Oct. 28, 2009

(86) PCT No.: PCT/EP2009/064213
§ 371 (c)(1), (2), (4) Date: Apr. 26, 2011

(87) PCT Pub. No.: WO2010/049448
PCT Pub. Date: May 6, 2010

(65) Prior Publication Data
US 2011/0201758 A1  Aug. 18, 2011

(30) Foreign Application Priority Data
Oct. 29, 2008 (EP) .................... 08167852

(51) Int. Cl.
C08F 255/02 (2006.01)
C08F 2/34 (2006.01)
C08F 4/649 (2006.01)
(52) U.S. Cl. ........... 525/240; 525/270; 525/322; 526/65
(58) Field of Classification Search ............ 526/65; 525/240, 270
See application file for complete search history.

(56) References Cited

U.S. PATENT DOCUMENTS
2007/0203298 A1  8/2007 Massari et al.

FOREIGN PATENT DOCUMENTS

| | | |
|---|---|---|
| EP | 0 491 566 | 6/1992 |
| EP | 0 787 750 | 8/1997 |
| EP | 0 887 379 | 12/1998 |
| EP | 1028985 B1 * | 4/2003 |
| EP | 1 935 938 | 6/2008 |
| EP | 1935938 A1 * | 6/2008 |
| WO | WO 87/07620 | 12/1987 |
| WO | WO 92/12182 | 7/1992 |
| WO | WO 92/19653 * | 11/1992 |
| WO | WO 92/19658 | 11/1992 |
| WO | WO 99/24478 | 5/1999 |
| WO | WO 99/24479 | 5/1999 |
| WO | WO 00/68315 | 11/2000 |
| WO | WO 01/19915 | 3/2001 |
| WO | WO 03/106553 | 12/2003 |
| WO | WO 2004/000899 | 12/2003 |
| WO | WO 2004/087807 | 10/2004 |
| WO | WO 2004/111095 | 12/2004 |

OTHER PUBLICATIONS

Zimm et al.; "The Dimension of Chain Molecules Containing Branches and Rings"; article from The Journal of Chemical Physics, vol. 17, No. 12; Dec. 1949; pp. 1301-1314.

* cited by examiner

*Primary Examiner* — Fred M Teskin
(74) *Attorney, Agent, or Firm* — Warn Partners, P.C.

(57) ABSTRACT

Heterophasic polypropylene composition comprising:—a polypropylene matrix (M) and—an elastomeric copolymer (E) being dispersed in the matrix (M), wherein the elastomeric copolymer (E) comprises units derived from—propylene and—ethylene and/or C4 to C20 α-olefin, and wherein further,—the intrinsic viscosity of the xylene cold soluble fraction (XCS) of the heterophasic polypropylene composition is above 2.1 dl/g measured according to ISO 1628-1 (at 135° C. in decaline) and/or—Mz/Mw of the xylene cold soluble fraction (XCS) of the heterophasic polypropylene composition is more than 2.6, preferably 2.7, wherein the Mz is the z-average molecular weight measured according to ISO 16014-4:2003 and Mw is the weight average molecular weight measured according to ISO 16014-4:2003.

18 Claims, No Drawings

TOUGH COMPOSITION FOR FOOD APPLICATIONS

CROSS-REFERENCE TO RELATED APPLICATIONS

This application is a National Stage of International Application No. PCT/EP2009/064213, filed Oct. 28, 2009. This application claims priority to European Patent Application No. 08167852.6 filed on Oct. 29, 2008. The disclosures of the above applications are incorporated herein by reference.

FIELD OF THE INVENTION

The present invention is directed to a new heterophasic polypropylene composition, its manufacture and use.

BACKGROUND OF THE INVENTION

Heterophasic propylene copolymers are well established in a lot of applications, such as molding applications, films, wires and cables or pipes, because of their good stiffness/impact ratio together with good flowability. For example heterophasic polymers are used for the production of car exteriors and interiors, in particular dashboards, door claddings, consoles, trims and the like as well as in the packaging area for food and medicals.

Heterophasic polymers are polymers having a matrix phase and a dispersed phase. The matrix phase is usually a propylene homopolymer or copolymer and the dispersed phase is often an elastomeric material, like a propylene copolymer comprising ethylene and/or other higher α-olefin(s).

Many different types of heterophasic systems have been described depending on the individual desire.

For instance in WO 01/19915 A1 an impact resistant polypropylene is disclosed. This product is featured by reasonable impact and stiffness behavior. However the material is difficult to obtain due to the very low melt flow rates be it measured on the end product or during the different process steps.

WO 03/106553 A1 is also directed to an impact resistant polypropylene. This impact resistant polypropylene has been produced in the presence of a metallocene catalyst, leading to a narrow molecular weight distribution. Further the good impact properties of the product are owed to the fact that nucleating agents have been added.

However the trend in industries is nowadays towards polymer materials with good flowability as a fast throughput of the material in the process lines is desired.

It is well known in the art a higher melt flow rate (MFR) improves the processability. Unfortunately known impact modified polypropylenes with rather high melt flow rate (MFR), respectively low molecular weight, tend to be intrinsically very brittle material. In order to improve its toughness high amounts of elastomeric polymer must be added. This in turn has an adverse effect on flow, stiffness and hexane extractables (hexane-solubles).

Moreover a high melt flow rate (MFR) means normally also a higher content of the low molecular weight (LMW) fraction in the polymer. The low molecular weight tail of the polymer comprises oligomers. Accordingly also the oligomer content in polymer compositions increases with increasing MFR. The oligomers thus belong to a generally known group of compounds, namely volatiles. Such volatiles contribute also to the so called "fogging" problem, i.e. these compounds tend to separate, e.g. evaporate, from the polymer material and cause fogging on the surrounding surfaces e.g. on car windows.

For these reasons, although much development work has been done in the field of heterophasic polypropylene copolymers there is a continuous need for alternative or improved heterophasic polypropylene copolymers, which fulfill the various demanding customer requirements in many end application areas of polymer materials, such as packaging, including food and medical packaging, fiber, pipe and automobile industry.

BRIEF SUMMARY OF THE INVENTION

Thus the object of the present invention is to provide a new heterophasic polypropylene composition having a low brittle/ductile transition temperature by keeping the other properties on a high level, for instance the stiffness in term of tensile modulus. A further desire is that the processability of the impact material is improved in terms of a fast throughput of the material in the process lines as this is cost saving. Additionally it is appreciated that the heterophasic polypropylene composition is featured by high purity, in particular in terms of low amounts of hexane solubles.

The finding of the present invention is that the heterophasic polypropylene composition must comprise a xylene cold soluble fraction (XCS) featured by a high molecular weight tail. A further finding is that the xylene cold soluble fraction (XCS) must have additionally or alternatively a rather high intrinsic viscosity.

Accordingly the present invention is directed in a first embodiment to a heterophasic polypropylene composition comprising a polypropylene matrix (M) and
an elastomeric copolymer (E) being dispersed in the matrix (M), wherein the elastomeric copolymer (E) comprises units derived from
propylene and
ethylene and/or C4 to C20 α-olefin,
and wherein further,
Mz/Mw of the xylene cold soluble fraction (XCS) of the heterophasic polypropylene composition is more than 2.6, wherein Mz is the z-average molecular weight measured according to ISO 16014-4:2003 and Mw is the weight average molecular weight measured according to ISO 16014-4:2003,
the intrinsic viscosity of the xylene cold soluble fraction (XCS) of the heterophasic polypropylene composition is above 2.1 dl/g measured according to ISO 1628-1 (at 135° C. in decaline) and/or
the MFR$_2$ (230° C.) of the heterophasic polypropylene composition measured according to ISO 1133 is more than 25 g/10 min.

Additionally it is preferred that
the Mz/Mn of the xylene cold soluble fraction (XCS) of the heterophasic polypropylene composition is below 15.2, and/or
the Mz of the xylene cold soluble fraction (XCS) of the heterophasic polypropylene composition is at least 950 kg/mol, wherein Mz is the z-average molecular weight measured according to ISO 16014-4:2003 and Mn is the number average molecular weight measured according to ISO 16014-4:2003.

In a second embodiment the present invention is directed to a heterophasic polypropylene composition comprising a polypropylene matrix (M) and an elastomeric copolymer (E) being dispersed in the matrix (M), wherein the elastomeric copolymer (E) comprises units derived from propylene and ethylene and/or C4 to C20 α-olefin, and wherein further, Mz/Mn of the xylene cold soluble fraction (XCS) of the heterophasic polypropylene composition is below 15.2, wherein Mz is the z-average molecular weight measured according to ISO 16014-4:2003 and Mn is the number average molecular weight measured according to ISO 16014-4:2003, the Mz of the xylene cold soluble fraction (XCS) of the heterophasic polypropylene composition is at least 950 kg/mol, the intrinsic viscosity of the xylene cold soluble fraction (XCS) of the heterophasic polypropylene composition is above 2.1 dl/g measured according to ISO 1628-1 (at 135° C. in decaline), and/or the $MFR_2$ (230° C.) of the heterophasic polypropylene composition measured according to ISO 1133 is more than 25 g/10 min.

Additionally it is preferred that the Mz/Mw of the xylene cold soluble fraction (XCS) of the heterophasic polypropylene composition is of more than 2.6, wherein Mz is the z-average molecular weight measured according to ISO 16014-4:2003 and Mw is the weight average molecular weight measured according to ISO 16014-4:2003.

It has been surprisingly found that a heterophasic polypropylene composition according to this invention possess a very good flowability by keeping the other properties, like stiffness and impact behaviour on a high level. In particular, the brittle/ductile transition temperature of the new heterophasic polypropylene composition is very low. This low brittle/ductile transition temperature is in particular achieved without the support of further additives, like nucleating agents.

DETAILED DESCRIPTION OF THE INVENTION

In the following the invention, i.e. the first and second embodiment, is defined in more detail.

As stated above the heterophasic polypropylene composition is featured by its xylene cold soluble fraction (XCS) having high molecular weight tail. This high molecular tail is in particular observed in gel permeation chromatography. In the present application the size exclusion chromatography (SEC) using Waters Alliance GPCV 2000 instrument with online viscosimeter has been applied. The oven temperature is 145° C. Trichlorobenzene is used as a solvent (ISO 16014).

The number average molecular weight (Mn) is an average molecular weight of a polymer expressed as the first moment of a plot of the number of molecules in each molecular weight range against the molecular weight. In effect, this is the total molecular weight of all molecules divided by the number of molecules. The number average molecular weight (Mn) is very sensitive to changes in the weight fractions of low molecular weight species. In turn, the weight average molecular weight (Mw) is the first moment of a plot of the weight of polymer in each molecular weight range against molecular weight. The weight average molecular weight (Mw) is very sensitive to changes in number of large molecules in a given sample of a polymer. Finally the z-average molecular weight (Mz) gives information about the very high molecular weight species of the polymer.

In the present invention it has been observed that the critical balance of good flowability and brittle/ductile transition temperature is only achieved by the right balance of short molecule species and long molecule species in the xylene cold soluble fraction (XCS) of the heterophasic polypropylene composition. As stated above, a high values of the z-average molecular weight (Mz) and of the weight average molecular weight (Mw) are indicators for long molecule species (Mw for long molecules and Mz for very long molecules) whereas the number average molecular weight (Mn) provides information about the short molecule species. Accordingly as the present invention is featured by a xylene cold soluble fraction (XCS) having high molecular weight tail, it is an appropriate approach to define the heterophasic polypropylene composition by its z-average molecular weight (Mz) and the ratio of the z-average molecular weight (Mz) to the number average molecular weight (Mn) and weight average molecular weight (Mw), respectively.

Accordingly in a first embodiment the xylene cold soluble fraction (XCS) of the heterophasic system is defined by the Mz/Mw-ratio and in a second embodiment by Mz/Mn-ratio. Particularly preferred the xylene cold soluble fraction (XCS) of the heterophasic system must comply with both requirements, i.e. with the Mz/Mw-ratio and Mz/Mn-ratio as indicated in the present invention.

Thus in the first embodiment the high molecular weight tail is in particular defined. It has been in particular observed that to achieve the desired properties the xylene soluble fraction (XCS) of the heterophasic polypropylene composition must contain rather high amounts of very long molecular species compared to the other long molecular species. Accordingly the Mz/Mw of the xylene cold soluble fraction (XCS) of the heterophasic system is more than 2.6, preferably more than 2.7, like at least 2.8.

In the second embodiment the Mz/Mn-ratio is on focus, i.e. the relationship between short molecular species and very long molecular species. The flowability is of significant importance in the present invention and thus can be used alternatively or additionally to define the invention. The flowability is driven by rather low molecular species. An indicator for the amount of short molecular species is the number average molecular weight (Mn). Thus the xylene cold soluble fraction (XCS) of the heterophasic polypropylene composition has an Mz/Mn of below 15.2, preferably below than 15.0, yet more preferably below than 14.8, still more preferably below than 14.5, like below than 14.3. On the other hand the Mz/Mn should be not below 12.5, more preferably not below 13.5. Accordingly it is preferred that the xylene cold soluble fraction (XCS) of the heterophasic polypropylene composition has an Mz/Mn of 12.5 to 15.2, more preferably of 13.3 to 15.0, yet more preferably of 13.8 to 14.5.

Further the xylene soluble fraction (XCS) of the heterophasic polypropylene composition preferably comprises rather high amounts of said very long molecular species. Accordingly as a further preferred requirement of the first and second embodiment is that the z-average molecular weight (Mz) of the xylene soluble fraction (XCS) of the heterophasic polypropylene composition measured according to ISO 16014-4:2003 is at least 950, more preferably more preferably at least 1000 kg/mol, like 1050 kg/mol.

The requirements of the first embodiment are also preferred requirements for the second embodiment. Likewise, the requirements of the second embodiment are also preferred requirements for the first embodiment.

The further preferred features apply for both embodiments as stated above, namely for the first and second embodiment.

To improve the flowability of the heterophasic polypropylene composition, the amount of short molecules should be not too low. Accordingly the weight average molecular weight (Mw) measured according to ISO 16014-4:2003 of the xylene cold soluble fraction (XCS) of the heterophasic polypropylene composition is preferably at least 250 kg/mol, more preferably at least 350 kg/mol, yet more preferably at least 390 kg/mol. On the other hand the weight average molecular weight (Mw) should be not too high. Thus a preferred range for the weight average molecular weight (Mw) of the xylene cold soluble fraction (XCS) of the heterophasic polypropylene composition is 250 to 550 kg/mol, like 350 to 450 kg/mol.

Of course also the molecular weight distribution (MWD) is desirable in a specific range. Accordingly it is preferred that the Mw/Mn (MWD) of the xylene cold soluble fraction (XCS) of the heterophasic polypropylene composition is from 3.5 to 6.0, more preferably from 4.5 to 5.5.

But not only the specific pattern of the molecular weight distribution (Mz, Mw, Mn, MWD) characterizes the heterophasic polypropylene composition of the present invention but also its melt flow rate (MFR). One object of the present invention is to provide good processable material. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the heterophasic polypropylene composition has an $MFR_2$ (230° C.) of at least, i.e. more than, 25.0 g/10 min, more preferably at least 30.0 g/10 min, still more preferably at least 37.0 g/10 min. On the other hand the heterophasic polypropylene composition shall be not too viscous. Thus the heterophasic polypropylene composition has preferably a $MFR_2$ (230° C.) of 25 to 60 g/10 min, more preferably from 30 to 55 g/10 min, like 35 to 50 g/10 min.

A further mandatory requirement of the present invention is that the intrinsic viscosity (IV) of the xylene cold soluble fraction (XCS) is rather high. Medium values of intrinsic viscosity improve the brittle/ductile transition temperature, i.e. lower the brittle/ductile transition temperature. Accordingly it is appreciated that the intrinsic viscosity of the xylene cold soluble fraction (XCS) of the heterophasic polypropylene composition is above 2.1 dl/g, more preferably at least 2.3 dl/g, yet more preferably at least 2.5 dl/g, like at least 2.7 dl/g. On the other hand the intrinsic viscosity should be not too high otherwise the flowability is decreased significantly without sizeable positive contribution on the fracture resistance—a worsening of the impact can even be observed if the intrinsic viscosity (IV) of the xylene cold soluble fraction (XCS) is too high. Accordingly the intrinsic viscosity of the xylene cold soluble fraction (XCS) of the heterophasic polypropylene composition is preferably in the range of 2.1 to 4.0 dl/g, more preferably in the range 2.3 to 3.8 dl/g, still more preferably 2.5 to 3.5 dl/g, like 2.7 to 3.5 dl/g. The intrinsic viscosity is measured according to ISO 1628 in decaline at 135° C.

Further the heterophasic polypropylene composition according to this invention can be additionally specified by the amount of units derived from propylene in the xylene soluble fraction (XCS). Rather high amounts of units derived from propylene in the xylene soluble fraction (XCS) can be only accomplished in case also the elastomeric copolymer (E) comprises predominantly units derived from propylene. Relatively high amounts of propylene units are appreciated as similar levels of propylene in the matrix as well as in the elastomeric phase support the reduction of the dispersed phase particle size and therewith a systematic increase of the impact strength and a decrease of the brittle/ductile transition temperature. As the xylene cold soluble fraction (XCS) of the heterophasic polypropylene composition is dominated by the elastomeric copolymer (E) (the xylene cold soluble fraction (XCS) of the polypropylene matrix (M) is not more than 5.0 wt.-%, preferably not more than 4.0 wt.-%, like not more than 3.0 wt.-%), it is appreciated that the amount of units derived from propylene in the xylene cold soluble fraction (XCS) of the heterophasic polypropylene composition, is at least 52 wt.-%, more preferably at least 58 wt.-%, yet more preferably at least 63 wt.-%. Accordingly the amount of the other $C_2$ to $C_{20}$ α-olefin(s), i.e. excluding propylene, in the xylene cold soluble fraction (XCS) of the heterophasic polypropylene composition, is below 48 wt.-%, more preferably below 42 wt.-%, yet more preferably below 37 wt.-%. Preferred ranges for the other $C_2$ to $C_{20}$ α-olefin(s), i.e. excluding propylene, in the xylene cold soluble fraction (XCS) of the heterophasic polypropylene composition, is 48 to 10 wt.-%, more preferably 40 to 15 wt.-%. The mentioned comonomer values apply in particular in case an elastomeric copolymer (E) is used in which ethylene as a comonomer is present. Preferably the elastomeric copolymer (E) is an ethylene-propylene rubber (EPR), in particular with a propylene and/or an ethylene content as defined in this paragraph.

The inventive heterophasic polypropylene composition is further specified by its individual components. As stated above the heterophasic polypropylene composition must comprise the polypropylene matrix (M) and the elastomeric copolymer (E) dispersed in said matrix. This however does not exclude the option that other polymers are present, in particular those which can also act as an impact modifier like the elastomeric copolymer (E). However it is preferred that the heterophasic polypropylene composition comprises the polypropylene matrix (M) and the elastomeric copolymer (E) as the only polymer components, i.e. no other polymers are present in the heterophasic polypropylene composition.

Especially good results are achieved in case a specific ratio is kept between both main polymer types of this invention. Accordingly it is appreciated that the heterophasic polypropylene composition comprises
  73 to 98 wt.-%, more preferably 80 to 95 wt.-%, of the polypropylene matrix (M) and
  2 to 27 wt.-%, more preferably 5 to 20 wt.-%, of the elastomeric copolymer (E), based on the polypropylene matrix (M) and the elastomeric copolymer (E).

More preferably the polypropylene matrix (M) and the elastomeric copolymer (E) together contribute to at least 85 wt.-%, more preferably at least 90 wt.-%, like at least 95 wt.-%, to the heterophasic polypropylene composition. This applies in particular in case the heterophasic polypropylene composition comprises only the polypropylene matrix (M) and the elastomeric copolymer (E) as polymer components. The remaining part may be additives, like antioxidants and/or nucleating agents. It is in particular appreciated that the present heterophasic polypropylene composition may comprise α-nucleating agents, like talc, phosphorus based compounds (NA 11) and sorbitol derivatives. In particular suitable α-nucleating agents are listed below, among them sodium 2,2'-methylenebis (4,6,-di-tert-butylphenyl) phosphate (NA 11) is the most preferred.

As explained above a heterophasic polypropylene composition must comprise a polypropylene matrix in which the elastomeric phase is dispersed. In the present invention the polypropylene matrix (M) can be a propylene homopolymer, a propylene copolymer or mixtures thereof. However it is preferred that the polypropylene matrix (A) is a propylene homopolymer.

Preferably the polypropylene matrix (M) is isotactic. Accordingly it is appreciated that the polypropylene matrix (M) has a rather high pentad concentration, i.e. higher than 90%, more preferably higher than 92%, still more preferably higher than 93% and yet more preferably higher than 95%, like higher than 99%.

The expression homopolymer used in the instant invention relates to a polypropylene that consists substantially, i.e. of at least 97 wt.-%, preferably of at least 98 wt.-%, more preferably of at least 99 wt.-%, still more preferably of at least 99.8 wt.-% of propylene units. In a preferred embodiment only propylene units in the propylene homopolymer are detectable. The comonomer content can be determined with FT infrared spectroscopy, as described below in the examples.

In case the polypropylene matrix (M) comprises or is a propylene copolymer, it is preferred that the propylene copolymer is a propylene random copolymer.

Where the polypropylene matrix (M) comprises a propylene copolymer or is random propylene copolymer, the copolymer comprises monomers copolymerizable with propylene, for example comonomers such as ethylene and/or $C_4$ to $C_{20}$ alpha-olefins, in particular ethylene and/or $C_4$ to $C_{10}$ alpha-olefins, e.g. 1-butene and/or 1-hexene. Preferably the propylene copolymer, i.e. the propylene random copolymer, comprises monomers copolymerizable with propylene from the group consisting of ethylene, 1-butene and 1-hexene. More specifically the propylene copolymer, i.e. the propylene random copolymer, comprises—apart from propylene—units derivable from ethylene and/or 1-butene. In a preferred embodiment the propylene copolymer, i.e. the propylene random copolymer, comprises units derivable from ethylene and propylene only. The comonomer content in the polypropylene matrix (M) (be it a propylene copolymer or a mixture of propylene homopolymer and propylene copolymer) is preferably relatively low, i.e. up to 6.0 wt.-%, more preferably 0.5 to 6.0 wt.-%, still more preferably 0.5 to 4.0 wt.-%, yet more preferably 0.5 to 2.0 wt.-%.

Further to improve the processability of the heterophasic polypropylene composition it is desired that the polypropylene matrix (M) has a rather high melt flow rate. Accordingly it is appreciated that the polypropylene matrix (M) of the inventive heterophasic polypropylene composition has an $MFR_2$ (230° C.) measured according to ISO 1133 of more than 50 g/10 min, more preferably of more than 55 g/10 min, still more preferably of more than 60 g/10 min. On the other hand the melt flow rate should be not too high. Thus the polypropylene matrix (M) has preferably an $MFR_2$ (230° C.) measured according to ISO 1133 from more than 50 to 100 g/10 min, more preferably from 52 to 95 g/10 min and yet more preferably from 58 to 85 g/10 min.

Additionally it is desired that the polypropylene matrix (M) has not only a rather high melt flow rate but also a rather low xylene cold soluble fraction (XCS). Thus it is preferred that the polypropylene matrix (M) fulfils the equation $MFR/XS>25$, preferably $MFR/XS>30$, more preferably $MFR/XS>33$ wherein "MFR" is the $MFR_2$ (230° C.) [g/10 min] of the polypropylene matrix (M) measured according to ISO 1133, and "XS" is the amount of the xylene cold soluble fraction [wt.-%] of the polypropylene matrix (M) measured according to ISO 6427 (23° C.).

Preferably the xylene cold soluble fraction (XCS) of the polypropylene matrix (M) measured according to ISO 6427 (23° C.) is at least 1.0 wt.-%. Even more preferred the polypropylene matrix (M) has a xylene cold soluble fraction (XCS) of not more than 3.5 wt.-%, preferably of not more than 3.0 wt.-%, like not more than 2.6 wt.-%. Thus a preferred range is 1.0 to 3.5 wt.-%, more preferred 1.0 to 3.0 wt.-%, still more preferred 1.2 to 2.6 wt.-%.

The polypropylene matrix (M) can be unimodal or multimodal, like bimodal in view of the molecular weight distribution and/or the comonomer content distribution. However it is preferred that the polypropylene matrix (M) is unimodal. Concerning the definition of unimodal and multimodal, like bimodal, it is referred to the definition below.

When the polypropylene matrix (M) is unimodal with respect to the molecular weight distribution and/or comonomer content, it may be prepared in a single stage process e.g. as slurry or gas phase process in a slurry or gas phase reactor. Preferably, the unimodal matrix is polymerized as a slurry polymerization. Alternatively, the unimodal matrix may be produced in a multistage process using at each stage process conditions which result in similar polymer properties.

The expression "multimodal" or "bimodal" used herein refers to the modality of the polymer, i.e.

the form of its molecular weight distribution curve, which is the graph of the molecular weight fraction as a function of its molecular weight, or more preferably the form of its comonomer content distribution curve, which is the graph of the comonomer content as a function of the molecular weight of the polymer fractions.

As will be explained below, the polymer components of the polypropylene matrix (M) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the polypropylene matrix (M) being a propylene homopolymer may be multimodal or bimodal in view of the molecular weight. In turn the polypropylene matrix (M) being a propylene copolymer, like a propylene random copolymer, may be multimodal, like bimodal, in view of the comonomer content and/or molecular weight. It is in particular appreciated in case the polypropylene matrix (M) is a propylene copolymer, like a propylene random copolymer, that it is multimodal, like bimodal, in view of the comonomer content.

Further in case the polypropylene matrix (M) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the polypropylene matrix (M). Accordingly in case of a bimodal system, in particular in view of the comonomer content, the split of the two fractions is roughly 50:50.

Thus in one embodiment the polypropylene matrix (M) comprises two fractions which differ in their comonomer content, like ethylene content (preferably as the only comonomer in the polypropylene matrix (M)), wherein the first fraction is present from 40 to 60 wt.-% and the second fraction from 60 to 40 wt.-%. In such a case the polypropylene matrix (M) comprises at least two fractions, more preferably consists of two fractions, that have a comonomer content, like ethylene content, which differ of at least 2.0 wt.-%, more preferably differ of at least 2.5 wt.-%. On the other hand the difference in the comonomer content in the two fractions should be not too high, i.e. not higher than 6.0 wt.-%, preferably not higher than 5.0 wt %, to avoid any phase separation tendencies. Thus it is appreciated that the polypropylene matrix (M) comprises at least two fractions, more preferably consists of two fractions, that have comonomer contents which differ of 2.0 to 6.0 wt.-%, more preferably of 2.5 to 5.0 wt.-%. Accordingly in one embodiment the polypropylene matrix (M) consists of a first fraction being a propylene homopolymer and a second fraction being a propylene copolymer having a comonomer content, preferably ethylene content, of at least 2.0 wt.-%, more preferably of at least 3.0 wt.-%, like at least 3.5 wt.-%, e.g. 4.0 wt.-%.

Additionally it is appreciated that the polypropylene matrix (M) is not chemically modified as it is known for instance from high melt strength polymers (HMS-polymer). Thus the propylene copolymer (A) is not cross-linked. The impact behaviour can normally also be improved by using branched polypropylenes as for instance described in EP 0 787 750, i.e. single branched polypropylene types (Y-polypropylenes having a backbone with a single long side-chain and an architecture resembles a "Y"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$, in which g' is the branching index, $[IV]_{br}$ is the intrinsic viscosity of the branched polypropylene and $[IV]_{lin}$, is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the polypropylene matrix (M) shall be at least 0.85, more preferably at least 0.90, yet more preferably at least 0.95, like 1.00. The same applies for the elastomeric copolymer (E) as well as for the total heterophasic polypropylene composition. Accordingly it is additionally appreciated also the elastomeric copolymer (E) is not crosslinked, i.e. has a branching index g' of at least 0.85, more preferably at least 0.90, yet more preferably at least 0.95, like 1.00. Thus in a preferred embodiment the total heterophasic polypropylene composition is not crosslinked, i.e. has a branching index g' of at least 0.85, more preferably at least 0.90, yet more preferably at least 0.95, like 1.00.

As a further requirement of the invention an elastomeric copolymer (E) must be present.

The elastomeric copolymer (E) must comprise units derived from
propylene and
ethylene and/or C4 to C20 α-olefin.

Preferably the elastomeric copolymer (E) comprises, preferably consists of, units derived from propylene and at least one alpha-olefin comonomer selected from the group consisting of ethylene, 1-butene, 1-pentene, 1-hexene, 1-heptene and 1-octene. Preferably the elastomeric copolymer (E) comprises at least units derived from propylene and ethylene and may comprise further units derived from alpha-olefins as defined in this paragraph. However it is in particular preferred that the elastomeric copolymer (E) comprises, more preferably consists of, propylene and ethylene as the only polymerizable units. Thus an ethylene-propylene rubber (EPR) as elastomeric copolymer (E) is most preferred.

Like the polypropylene matrix (M) the elastomeric copolymer (E) can be unimodal or multimodal, like bimodal. However it is preferred that the elastomeric copolymer (E) is unimodal. Concerning the definition of unimodal and multimodal, like bimodal, it is referred to the definition below.

The elastomeric copolymer (E) is in particular featured by an amount of ethylene and/or $C_4$ to $C_{10}$ alpha-olefin lower than 50 wt.-%. Accordingly the amount of the other $C_2$ to $C_{10}$ alpha-olefin(s), i.e. excluding propylene, in the elastomeric copolymer (E) is up to 50 wt.-%, more preferably up to 45 wt.-%, like up to 43 wt.-%. Preferred ranges for the other $C_2$ to $C_{10}$ alpha-olefin(s), i.e. excluding propylene, in the elastomeric copolymer (E) is 20 to 50 wt.-%, preferably 20 to 45 wt.-%. Preferably the elastomeric copolymer (E) is an ethylene-propylene rubber (EPR), in particular with propylene and/or ethylene content as defined in this paragraph.

As stated above the heterophasic polypropylene composition may further comprise small amounts of additives known to those skilled in the art, e.g. stabilizers, acid scavengers, lubricants and mold release agents, fillers, nucleating agents, antistatics, plasticizers, dyes, pigments or flame retardants. In general, these are incorporated during granulation of the pulverulent product obtained in the polymerization.

Stabilizers include antioxidants such as sterically hindered phenols, processing stabilizers such as phosphites or phosphonites, acid scavengers such as calcium stearate or zinc stearate or dihydrotalcite, sterically hindered amines or UV stabilizers. In general, the heterophasic polypropylene composition of the present invention contains one or more stabilizers in amounts of up to 2 wt.-%.

Suitable lubricants and mold release agents are, for example, fatty acids, calcium or zinc salts of fatty acids, fatty acid amides or low molecular weight polyolefin waxes, which are usually used in concentrations of up to 2 wt.-%.

Possible fillers are, for example, talc, chalk or glass fibers, and these are usually used in amounts of up to 50 wt.-%, like 0.3 to 40 wt.-%.

Examples of suitable α-nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis (4,6,-di-tert-butylphenyl) phosphate.

Accordingly preferred α-nucleating agents are selected from the group consisting of
(i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), nonitol,1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer.

The nucleating agent content of the heterophasic polypropylene composition is preferably up to 5 wt.-%.

Such additives are generally commercially available and are described, for example, in Gachter/Muller, Plastics Additives Handbook, 4th Edition, Hansa Publishers, Munich, 1993.

In a preferred embodiment, the heterophasic polypropylene composition of the present invention contain from 0.1 to 1 wt.-%, preferably from 0.15 to 0.25 wt.-%, of a nucleating agent, in particular salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate].

In the following the process for the preparation of the heterophasic polypropylene composition is described in more detail.

According to the present invention the heterophasic polypropylene composition discussed above is produced in a multistage process, wherein the polypropylene matrix (M) is produced at least in one slurry reactor and subsequently the elastomeric copolymer (E) is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below, comprising the Ziegler-Natta procatalyst, the external donor and optionally the cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the heterophasic polypropylene composition according to this invention are produced by using a special Ziegler-Natta procatalyst in combination with a special external donor, as described below in detail, preferably in the Spheripol® or in the Borstar®-PP process.

One preferred multistage process may therefore comprise the steps of:

producing a polypropylene matrix (M) in the presence of the chosen catalyst system, as described in detail below, comprising the special Ziegler-Natta procatalyst (i), an external donor (iii) and optionally the cocatalyst (ii) in a first slurry reactor and optionally in a second slurry reactor, both slurry reactors using the same polymerization conditions, transferring the slurry reactor product into at least one first gas phase reactor, like one gas phase reactor or a first and a second gas phase reactor connected in series, producing an elastomeric copolymer (E) in the presence of the polypropylene matrix (M) and in the presence of the catalyst system in said at least first gas phase reactor, recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the heterophasic polypropylene composition is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

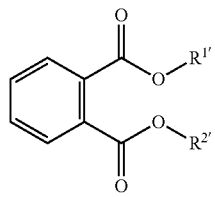

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

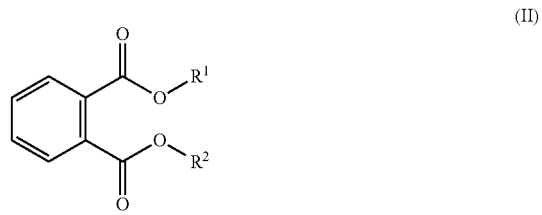

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BC-1 catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and optionally a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic polypropylene composition according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \quad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is either dicyclopentyl dimethoxy silane [$Si(OCH_3)_2(cyclo-pentyl)_2$] or diisopropyl dimethoxy silane [$Si(OCH_3)_2(CH(CH_3)_2)_2$].

The invention is also directed to the use of a catalyst system comprising
(i) a Ziegler-Natta procatalyst which contains a trans-esterification product of a lower alcohol and a phthalic ester and
(ii) optionally an organometallic cocatalyst and
(iii) an external donor represented by formula (III)

$$Si(OCH_3)_2R_2^5 \quad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms, for the manufacture of a heterophasic polypropylene composition as defined in the instant invention. Further preferred external donors are represented by formula (III) wherein $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl. More preferably the external donor is either dicyclopentyl dimethoxy silane [$Si(OCH_3)_2(cyclo-pentyl)_2$] or diisopropyl dimethoxy silane [$Si(OCH_3)_2(CH(CH_3)_2)_2$].

Furthermore, the current invention also provides a multi-stage process for producing heterophasic polypropylene composition as defined herein using the catalyst system comprising components (i), (iii) and optionally (ii).

The additives as stated above are added afterwards to the heterophasic polypropylene composition, which is collected from the final reactor of the series of reactors. Preferably, these additives are mixed into the composition prior to or during the extrusion process in a one-step compounding process. Alternatively, a master batch may be formulated, wherein the heterophasic polypropylene composition is first mixed with only some of the additives.

For mixing, a conventional compounding or blending apparatus, e.g. a Banbury mixer, a t-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive heterophasic polypropylene composition.

The heterophasic polypropylene composition according to the invention may be pelletized and compounded using any of the variety of compounding and blending methods well known and commonly used in the resin compounding art.

The composition of the current invention is preferably used for the production of moulded articles, preferably injection moulded articles. Even more preferred is the use for the production of thin wall packaging articles, household electrical materials and automotive applications, especially of car interiors and exteriors, in particular car interiors as for example dashboards, door claddings, consoles, trims and the like and for food and medical packaging.

The current invention also provides articles comprising the inventive heterophasic polypropylene composition.

Accordingly the present invention defines moulded articles comprising an heterophasic polypropylene composition as defined in the instant invention. Particularly, these articles are produced by injection moulding.

Surprisingly, it was found that the moulded articles manufactured with the heterophasic polypropylene composition prepared according to the invention are featured by very low brittle/ductile transition temperature whilst the other properties are kept on high level.

In the following the present invention is further illustrated by means of examples.

EXAMPLES

A. Measuring Methods

The following definitions of terms and determination methods apply for the above general description of the invention as well as to the below examples unless otherwise defined.

1. NMR-spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

2. Mw, Mn, Mz, MWD

Mw/Mn/Mz/MWD are measured by Gel Permeation Chromatography (GPC) according to the following method:

The weight average molecular weight (Mw), the number average molecular weight (Mn), z-average molecular weight (Mz), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

3. Melt Flow Rate (MFR)

The melt flow rates are measured with a load of 2.16 kg ($MFR_2$) at 230° C. The melt flow rate is that quantity of polymer in grams which the test apparatus standardised to ISO 1133 extrudes within 10 minutes at a temperature of 230° C. under a load of 2.16 kg.

4. Comonomer Content

Comonomer content (wt %) is determined in a known manner based on Fourier transform infrared spectroscopy (FTIR) determination calibrated with $C^{13}$-NMR.

5. Xylene Cold Soluble Fraction (XCS Wt %)

The xylene cold soluble fraction (XCS) is determined at 23° C. according to ISO 6427.

6. Intrinsic Viscosity

The intrinsic viscosity (IV) is determined according to ISO 1628-1 at 135° C. with decaline as solvent.

7. Flexural Modulus

The flexural modulus was measured according to ISO 178 by using injection molded test specimens as described in EN ISO 1873-2 (80×10×4 mm).

8. Tensile Modulus; Elongation at break; Yield Stress

Tensile Modulus, elongation at break, yield stress are measured according to ISO 527-2 (cross head speed=50 mm/min; 23° C.) using injection molded specimens as described in EN ISO 1873-2 (dog bone shape, 4 mm thickness).

9. Charpy Impact Test

The charpy notched impact strength (Charpy NIS) is measured according to ISO 179 1eA at (+23° C., 0° C., −20° C.). Injection molded test bars of 80×10×4 $mm^3$ prepared in accordance with EN ISO 1873-2 are used for this test.

10. Hexane-Solubles (wt.-%)

The content of hexane-solubles was determined according to FDA CFR 21 §177.1520. Procedure: 1 g sample of a polymer film of 100 μm thickness (produced on a PM30 cast film line using chill-roll temperature of 40° C.) was extracted at 50° C. in 400 ml n-hexane for 2 hours and then filtered on a filter paper N° 41. The filtrate was then evaporated and the total residue weighed as a measure of the n-hexane extractable fraction.

11. Brittle/Ductile Transition Temperature by Instrumented Falling Weight Impact The temperature at which the brittle/ductile transition occurred has been determined using Instrumented Falling Weight Impact tests (conducted following ISO 6603-2 with a velocity of 4.4 m/s, on an Hydropuls VHS Co. SCHENK instrument) using 60×60×3 mm injection moulded plaques (prepared following ISO 1873-2.).

Following procedure has been used. A temperature window from −60° C. to 60° C. has been screened in 3K/steps. Measurement has been repeated 5 times at each temperature. Average of puncture energy [J] (i.e. area under the curve force-displacement) at each temperature has been plotted as a function of the temperature. The temperature at which a maximum of the puncture energy has been recorded has been taken as brittle/ductile transition temperature.

12. Shrinkage

Shrinkage was measured according to an internal standard using 150×80×2 mm injection molded plaques. Measurements were performed after injection and conditioning at room temperature for at least 96 h in the flow direction and perpendicular to the flow direction. Following conditions were used for injection molding: injection time: 3 s, melt temperature: 240° C., mold temperature: 50° C., hold pressure: from 73 to 23 bars in 10 steps, hold time: 10 s, cooling time: 20 s.

B. Preparation of Examples

The heterophasic polypropylene compositions 1 to 3 contain an unimodal matrix (M) and an unimodal elastomeric copolymer (E).

The heterophasic polypropylene compositions were produced in a plant having a prepolymerization reactor, a loop reactor and one fluid bed gas-reactor connected in series. The catalyst used in the polymerization was prepared according to WO 92/19653 with DOP as dialkylphthalat of the formula (I) and ethanol as alcohol, the cocatalyst was triethylaluminium (TEA) and as an external donor those indicated in Table 1.

After a first pre-polymerisation step the catalyst system was fed to the slurry reactor, where the polymerisation of the polypropylene homopolymer matrix (M) phase was performed. The slurry phase loop reactor was then followed by a gas phase reactor in series, in which the elastomeric copolymer (E) disperse phase was produced by copolymerisation of propylene with ethylene comonomer.

TABLE 1

| | Reaction conditions | | | |
| --- | --- | --- | --- | --- |
| | | E 1 | E 2 | CE 1 |
| External donor | | C | I | C* |
| 1) Prepolymerization | | | | |
| temperature | [° C.] | 20 | 20 | 20 |
| TEA/D | [g/g] | 3 | 3 | 3 |
| TEA/$C_3$ | [g/kg] | 0.2 | 0.2 | 0.2 |
| 2) Loop-reactor | | | | |
| temperature | [° C.] | 62 | 65 | 62 |
| pressure | [bar] | 34 | 34 | 34 |
| $MFR_2$ | [g/10 min] | 85 | 89 | 92 |
| $H_2/C_3$ | [ppm] | 8500 | 6050 | 7600 |
| XCS | [wt %] | 2.4 | 1.6 | 2.6 |
| 3) Gas phase reactor | | | | |
| temperature | [° C.] | 80 | 80 | 80 |
| pressure | [bar] | 11.5 | 11 | 10 |
| $C_2$ | [wt %] | 6.2 | 7.3 | 6.8 |
| $C_3$/XCS | [wt %] | 66.5 | 65.5 | 66.0 |
| IV/XCS total | [dl/g] | 2.81 | 2.62 | 2.72 |
| $MFR_2$ (230° C.) | [g/10 min] | 40 | 41 | 45 |

TABLE 1-continued

Reaction conditions

| | | E 1 | E 2 | CE 1 |
|---|---|---|---|---|
| XCS | [wt %] | 16.0 | 15.5 | 16.8 |
| Split loop:GPR | [%] | 84:16 | 82.5:17.5 | 81.5:18.5 |

C dicyclopentyl dimethoxy silane [Si(OCH$_3$)$_2$(cyclo-pentyl)$_2$]
I diisopropyl dimethoxy silane [Si(OCH$_3$)$_2$(CH(CH$_3$)$_2$)$_2$].
D donor
TEA triethylaluminium
C2 ethylene
C3 propylene
XCS xylene cold soluble fraction
IV/XCS intrinsic viscosity of the xylene cold soluble fraction
GPR gas phase reactor
*The catalyst used in the polymerization was the ZN118 catalyst commercially available from Basell, the cocatalyst was triethylaluminium (TEA) and as an external donor dicyclopentyl dimethoxy silane [Si(OCH$_3$)$_2$(cyclo-pentyl)$_2$] was used The heterophasic polypropylene compositions 1 to 3 were initially obtained in powder form.

The heterophasic polypropylene compositions 1 to 3 were mixed with 0.5 wt.-% talc A3 (from Luzenac (Naintsch), 0.05 wt.-% calciumstearate and 0.1 wt.-% Irganox B215 (Ciba Speciality Chemicals, antioxidant).

The mixtures were compounded by feeding the components to a Prism 24 twin-screw extruder (Prism Ltd., Staffordshire, UK). The material was then extruded through a strand die, cooled and chopped to form pellets.

TABLE 2

Product properties

| | | | E 1 | E 2 | CE 1 |
|---|---|---|---|---|---|
| Flowability | MFR | [g/10 min] | 38 | 41 | 40 |
| Analytics | XCS | [wt %] | 15 | 14.9 | 15.9 |
| | IV(XCS) | [dl/g] | 3.45 | 3.5 | 2.7 |
| | C3(XCS) | [wt %] | 66.4 | 65.2 | 66 |
| | Mw (XCS) | [kg/mol] | 437 | 390 | 381 |
| | Mn (XCS) | [kg/mol] | 85 | 77 | 76 |
| | Mz (XCS) | [kg/mol] | 1210 | 1072 | 860 |
| | MWD(XCS) | [—] | 5.2 | 5.1 | 5.1 |
| | Mz/Mn (XCS) | [—] | 14.2 | 13.9 | 11.3 |
| | Mz/Mw (XCS) | [—] | 2.8 | 2.8 | 2.2 |
| Purity | C6-solubles | [wt %] | 3.1 | 3.1 | 4 |
| Tensile test | Modulus | [MPa] | 1453 | 1453 | 1424 |
| | Yield stress | [MPa] | 26.6 | 26 | 26.2 |
| | elong. break | [%] | 23 | 20 | 24 |
| Flexural test | Modulus | [MPa] | 1348 | 1337 | 1330 |
| Impact - Charpy | NIS (23° C.) | [kJ/m$^2$] | 6 | 6.2 | 6.4 |
| | NIS (0° C.) | [kJ/m$^2$] | 4.3 | 4.2 | 4.6 |
| | NIS (−20° C.) | [kJ/m$^2$] | 3.3 | 3.3 | 3.2 |
| Brittle/ductile transition | T (max) | [° C.] | 8 | 0 | 22 |
| Shrinkage | Longitudinal | [%] | 1,044 | 1,093 | 1,013 |
| | Lateral | [%] | 1,136 | 1,175 | 1,092 |

We claim:

1. Heterophasic polypropylene composition comprising:
73 to 98 wt.-% of a polypropylene matrix (M) being a propylene homopolymer, and,
2 to 27 wt.-% of an elastomeric copolymer (E) being dispersed in the matrix (M),
based on the polypropylene matrix (M) and the elastomeric copolymer (E)
wherein the elastomeric copolymer (E) comprises units derived from propylene and
ethylene and/or C4 to C20 α-olefin,
and wherein further,
Mz/Mw of the xylene cold soluble fraction (XCS) of the heterophasic polypropylene composition is of more than 2.6, wherein Mz is the z-average molecular weight measured according to ISO 16014-4:2003 and Mw is the weight average molecular weight measured according to ISO 16014-4:2003,
the intrinsic viscosity of the xylene cold soluble fraction (XCS) of the heterophasic polypropylene composition is above 2.1 dl/g measured according to ISO 1628-1 (at 135° C. in decaline),
the MFR$_2$ (230° C.) of the heterophasic polypropylene composition measured according to ISO 1133 is more than 25 g/10 min, and wherein the amount of propylene derived monomer units in the xylene cold soluble fraction (XCS) of the heterophasic polypropylene composition is at least 58 wt.-%.

2. Heterophasic polypropylene composition according to claim 1, wherein
the Mz/Mn of the xylene cold soluble fraction (XCS) of the heterophasic polypropylene composition is below 15.2, and/or
the Mz of the xylene cold soluble fraction (XCS) of the heterophasic polypropylene composition is at least 950 kg/mol,
wherein Mz is the z-average molecular weight measured according to ISO 16014-4:2003 and Mn is the number average molecular weight measured according to ISO 16014-4:2003.

3. Heterophasic polypropylene composition comprising:
73 to 98 wt.-% of a polypropylene matrix (M) being a propylene homopolymer, and,
2 to 27 wt.-% of an elastomeric copolymer (E) being dispersed in the matrix (M), based on the polypropylene matrix (M) and the elastomeric copolymer (E) wherein the elastomeric copolymer (E) comprises units derived from
propylene and
ethylene and/or C4 to C20 α-olefin,
and wherein further,
Mz/Mn of the xylene cold soluble fraction (XCS) of the heterophasic polypropylene composition is below 15.2, wherein Mz is the z-average molecular weight measured according to ISO 16014-4:2003 and Mn is the number average molecular weight measured according to ISO 16014-4:2003,
the Mz of the xylene cold soluble fraction (XCS) of the heterophasic polypropylene composition is at least 950 kg/mol,
the intrinsic viscosity of the xylene cold soluble fraction (XCS) of the heterophasic polypropylene composition is above 2.1 dl/g measured according to ISO 1628-1 (at 135° C. in decaline), and
the MFR$_2$ (230° C.) of the heterophasic polypropylene composition measured according to ISO 1133 is more than 25 g/10 min, and wherein the amount of propylene derived monomer units in the xylene cold soluble fraction (XCS) of the heterophasic polypropylene composition is at least 58 wt.%.

4. Heterophasic polypropylene composition according to claim 3, wherein
the Mz/Mw of the xylene cold soluble fraction (XCS) of the heterophasic polypropylene composition is more than 2.6, wherein Mz is the z-average molecular weight measured according to ISO 16014-4:2003 and Mw is the weight average molecular weight measured according to ISO 16014-4:2003.

5. Heterophasic polypropylene composition according to claim 3, wherein the weight average molecular weight (Mw) measured according to ISO 16014-4:2003 of the xylene cold soluble fraction (XCS) of the heterophasic polypropylene composition is at least 250 kg/mol.

6. Heterophasic polypropylene composition according to claim 3, wherein Mw/Mn (MWD) of the xylene cold soluble fraction (XCS) of the heterophasic polypropylene composition is from 3.5 to 6.0, wherein Mn is the number average molecular weight measured according to ISO 16014-4:2003 and Mw is the weight average molecular weight measured according to ISO 16014-4:2003.

7. Heterophasic polypropylene composition according to claim 3, wherein the polypropylene matrix (M) fulfils the equation:

MFR/*XS*>25 wherein
"MFR" is the $MFR_2$ (230° C.) [g/10 min] of the polypropylene matrix (M) measured according to ISO 1133, and
"XS" is the amount of the xylene cold soluble fraction [wt.-%] of the polypropylene matrix (M) measured according to ISO 6427(23° C.).

8. Heterophasic polypropylene composition according to claim 3, wherein the polypropylene matrix (M) has an $MFR_2$ (230° C.) measured according to ISO 1133 of more than 50 g/10 min.

9. Heterophasic polypropylene composition according to claim 3, wherein the polypropylene matrix (M) has a xylene cold soluble fraction (XCS) measured according to according to ISO 6427(23° C.) of not more than 3.5 wt.-%.

10. Heterophasic polypropylene composition according to claim 3, wherein:
 (a) the polypropylene matrix (M) is an isotactic propylene homopolymer, and/or,
 (b) the elastomeric copolymer (E) comprises monomer units derived from propylene and ethylene only.

11. Heterophasic polypropylene composition according to claim 3, wherein the polypropylene matrix (M) and the elastomeric copolymer (E) together contribute to at least 85 wt.-% to the heterophasic polypropylene composition.

12. Articles, comprising a heterophasic polypropylene composition comprising:
 73 to 98 wt.-% of a polypropylene matrix (M) being a propylene homopolymer, and,
 2 to 27 wt.-% of an elastomeric copolymer (E) being dispersed in the matrix (M),
based on the polypropylene matrix (M) and the elastomeric copolymer (E)
wherein the elastomeric copolymer (E) comprises units derived from
 propylene and
 ethylene and/or C4 to C20 α-olefin,
and wherein further,
 Mz/Mw of the xylene cold soluble fraction (XCS) of the heterophasic polypropylene composition is of more than 2.6, wherein Mz is the z-average molecular weight measured according to ISO 16014-4:2003 and Mw is the weight average molecular weight measured according to ISO 16014-4:2003,
 the intrinsic viscosity of the xylene cold soluble fraction (XCS) of the heterophasic polypropylene composition is above 2.1 dl/g measured according to ISO 1628-1 (at 135° C. in decaline), and
 the $MFR_2$ (230° C.) of the heterophasic polypropylene composition measured according to ISO 1133 is more than 25 g/10 min, and wherein the amount of propylene derived monomer units in the xylene cold soluble fraction (XCS) of the heterophasic polypropylene composition is at least 58 wt.-%.

13. Process for the preparation of a heterophasic polypropylene composition comprising:
 producing in a first slurry reactor and optionally in a second slurry reactor, both slurry reactors using the same polymerization conditions, a polypropylene matrix (M) using a catalyst system comprising
  (i) a Ziegler-Natta procatalyst which contains a transesterification product of a lower alcohol and a phthalic ester,
  (ii) optionally an organometallic cocatalyst and
  (iii) an external donor represented by formula (III)

$Si(OCH_3)_2R_2^5$ (III)

wherein $R^5$ represents a branched-alkyl group having 3 to 12 carbon atoms, or a cyclo-alkyl having 4 to 12 carbon atoms,
 transferring the slurry reactor product into at least a first gas phase reactor,
 producing an elastomeric copolymer (E) in the presence of the polypropylene matrix (M) and in the presence of the catalyst system in at least said first gas phase reactor,
 recovering the polymer product for further processing,
wherein
 73 to 98 wt.-% of a polypropylene matrix (M) being a propylene homopolymer, and,
 2 to 27 wt.-% of an elastomeric copolymer (E) being dispersed in the matrix (M),
based on the polypropylene matrix (M) and the elastomeric copolymer (E)
wherein the elastomeric copolymer (E) comprises units derived from
 propylene and
 ethylene and/or C4 to C20 α-olefin,
and wherein further,
 Mz/Mw of the xylene cold soluble fraction (XCS) of the heterophasic polypropylene composition is of more than 2.6, wherein Mz is the z-average molecular weight measured according to ISO 16014-4:2003 and Mw is the weight average molecular weight measured according to ISO 16014-4:2003,
 the intrinsic viscosity of the xylene cold soluble fraction (XCS) of the heterophasic polypropylene composition is above 2.1 dl/g measured according to ISO 1628-1 (at 135° C. in decaline),
 the $MFR_2$ (230° C.) of the heterophasic polypropylene composition measured according to ISO 1133 is more than 25 g/10 min, and wherein the amount of propylene derived monomer units in the xylene cold soluble fraction (XCS) of the heterophasic polypropylene composition is at least 58 wt.-%.

14. Heterophasic polypropylene composition according to claim 3, wherein the polypropylene matrix (M) has a xylene cold soluble fraction (XCS) measured according to according to ISO 6427(23° C.) of not more than 3.0 wt.-%.

15. Heterophasic polypropylene composition according to claim 1, wherein the weight average molecular weight (Mw) measured according to ISO 16014-4:2003 of the xylene cold soluble fraction (XCS) of the heterophasic polypropylene composition is at least 250 kg/mol.

16. Heterophasic polypropylene composition according to according to claim 1, wherein Mw/Mn (MWD) of the xylene cold soluble fraction (XCS) of the heterophasic polypropylene composition is from 3.5 to 6.0, wherein Mn is the number average molecular weight measured according to ISO 16014-4:2003 and Mw is the weight average molecular weight measured according to ISO 16014-4:2003.

17. Heterophasic polypropylene composition according to according to claim 1, wherein the polypropylene matrix (M) fulfils the equation $$MFR/XS > 25$$

wherein

"MFR" is the $MFR_2$ (230° C.) [g/10 min] of the polypropylene matrix (M) measured according to ISO 1133, and "XS" is the amount of the xylene cold soluble fraction [wt.-%] of the polypropylene matrix (M) measured according to ISO 6427 (23° C.).

18. Heterophasic polypropylene composition according to according to claim 1, wherein the polypropylene matrix (M) has a xylene cold soluble fraction (XCS) measured according to according to ISO 6427 (23° C.) of not more than 3.5 wt.-%.

* * * * *